United States Patent
Hong et al.

(10) Patent No.: US 12,378,363 B2
(45) Date of Patent: Aug. 5, 2025

(54) THERMAL CONDUCTIVE SILICONE COMPOSITION

(71) Applicant: DOW SILICONES CORPORATION, Midland, MI (US)

(72) Inventors: Debo Hong, Shanghai (CN); Chong Xing, Shanghai (CN); Zhiting Liu, Shanghai (CN)

(73) Assignee: DOW SILICONES CORPORATION, Midland, MI (US)

( * ) Notice: Subject to any disclaimer, the term of this patent is extended or adjusted under 35 U.S.C. 154(b) by 795 days.

(21) Appl. No.: 17/620,688

(22) PCT Filed: Jun. 21, 2019

(86) PCT No.: PCT/CN2019/092285
§ 371 (c)(1),
(2) Date: Dec. 18, 2021

(87) PCT Pub. No.: WO2020/252773
PCT Pub. Date: Dec. 24, 2020

(65) Prior Publication Data
US 2022/0325048 A1    Oct. 13, 2022

(51) Int. Cl.
*C08G 77/44*    (2006.01)
*C08K 3/22*    (2006.01)
*C08K 5/549*    (2006.01)
*C08L 83/10*    (2006.01)

(52) U.S. Cl.
CPC ........... *C08G 77/44* (2013.01); *C08K 5/549* (2013.01); *C08L 83/10* (2013.01); *C08K 2003/2227* (2013.01)

(58) Field of Classification Search
CPC ............ C08G 77/44; C08K 5/549; C08K 2003/2227; C08L 83/10
USPC ........................................................ 523/206
See application file for complete search history.

(56) References Cited

U.S. PATENT DOCUMENTS

| | | | |
|---|---|---|---|
| 4,618,646 A | 10/1986 | Takago et al. | |
| 4,687,829 A | 8/1987 | Chaffee et al. | |
| 4,711,928 A | 12/1987 | Lee et al. | |
| 4,772,675 A | 9/1988 | Klosowski et al. | |
| 4,871,827 A | 10/1989 | Klosowski et al. | |
| 4,888,404 A | 12/1989 | Klosowski et al. | |
| 4,898,910 A | 2/1990 | Kamis et al. | |
| 5,036,131 A | 7/1991 | Himstedt | |
| 5,457,148 A | 10/1995 | Lucas | |
| 5,563,210 A | 10/1996 | Donatelli et al. | |
| 6,121,368 A | 9/2000 | Heying et al. | |
| 6,251,990 B1 | 6/2001 | Meguriya et al. | |
| 6,265,480 B1 | 7/2001 | Enami et al. | |
| 7,592,383 B2 | 9/2009 | Fukui | |
| 7,955,696 B2 | 6/2011 | Baikerikar et al. | |
| 8,101,677 B2 | 1/2012 | Nishiumi et al. | |
| 8,957,153 B2 | 2/2015 | Kodama et al. | |
| 9,079,801 B2 | 7/2015 | Lodyga et al. | |
| 9,732,239 B2 | 8/2017 | Clapp et al. | |
| 9,944,742 B2 | 4/2018 | Saxena et al. | |
| 9,994,754 B2 | 6/2018 | Clough | |
| 10,072,151 B2 | 9/2018 | Kodama et al. | |
| 2001/0034403 A1 | 10/2001 | Takuman et al. | |
| 2004/0110077 A1 | 6/2004 | Yachi et al. | |
| 2006/0247349 A1 | 11/2006 | Kollmann et al. | |
| 2008/0242763 A1 | 10/2008 | Ramakrishnan et al. | |
| 2008/0300358 A1 | 12/2008 | Cook et al. | |
| 2009/0281222 A1 | 11/2009 | Nishiumi et al. | |
| 2009/0291238 A1 | 11/2009 | Scott et al. | |
| 2009/0298982 A1 | 12/2009 | Meyer et al. | |
| 2011/0163460 A1 | 7/2011 | Kato et al. | |
| 2013/0065983 A1 | 3/2013 | Ono et al. | |
| 2014/0060903 A1 | 3/2014 | Hamada et al. | |
| 2014/0242149 A1 | 8/2014 | Gantner et al. | |
| 2014/0288246 A1 | 9/2014 | Ota et al. | |
| 2015/0051345 A1 | 2/2015 | Fang et al. | |
| 2015/0097138 A1* | 4/2015 | Kato | C08K 5/56 252/75 |

(Continued)

FOREIGN PATENT DOCUMENTS

| | | |
|---|---|---|
| CN | 101346439 A | 1/2009 |
| CN | 102675882 A | 9/2012 |

(Continued)

OTHER PUBLICATIONS

Ishihara et al., JP 2011-178821 A machine translation in English, Sep. 15, 2011. (Year: 2011).*
Machine assisted English translation of JP2001192641A obtained from https://worldwide.espacenet.com/patent on Jul. 13, 2023, 8 pages.
Machine assisted English translation of JP2004292724A obtained from https://worldwide.espacenet.com/patent on Jul. 13, 2023, 6 pages.
Machine assisted English translation of JP2009235279A obtained from https://worldwide.espacenet.com/patent on Jul. 13, 2023, 6 pages.
Handbook of Fillers, Chapter 5: "Physical Properties of Fillers and Filled Materials", published by ChemTec Publishing, 2016, p. 316.
Machine assisted English translation of JP2009235265 obtained from https://patents.google.com/patent on Apr. 1, 2022, 11 pages.

(Continued)

*Primary Examiner* — David T Karst
(74) *Attorney, Agent, or Firm* — Warner Norcross + Judd LLP

(57) ABSTRACT

A thermal conductive silicone composition comprises: (A) a liquid organopolysiloxane having at least two silicon atom-bonded alkenyl groups with 2 to 6 carbon atoms per molecule; (B) a thermal conductive filler with an average particle size of from 5 to 50 μm; (C) a thermal conductive filler with an average particle size of at least 0.1 μm and less than 5 μm; and (D) a carbasilatrane derivative. Optionally, the composition further comprises: (E) an organosiloxane having at least one silicon atom-bonded hydrogen atom per molecule; and/or (F) a hydrosilylation reaction catalyst. The composition exhibits excellent storage stability and handleability despite containing a large quantity of a thermal conductive filler to exhibit high thermal conductivity.

12 Claims, No Drawings

(56) References Cited

U.S. PATENT DOCUMENTS

| | | | |
|---|---|---|---|
| 2015/0232666 A1 | 8/2015 | Ono et al. |
| 2016/0017185 A1 | 1/2016 | Albaugh et al. |
| 2017/0029671 A1 | 2/2017 | Sawanobori et al. |
| 2017/0058103 A1 | 3/2017 | Fujisawa et al. |
| 2017/0121462 A1 | 5/2017 | Fujisawa et al. |
| 2020/0123427 A1 | 4/2020 | Endo et al. |
| 2020/0347229 A1 | 11/2020 | Fujisawa et al. |
| 2021/0225720 A1 | 7/2021 | Sutoh |
| 2023/0083453 A1 | 3/2023 | Zampella et al. |

FOREIGN PATENT DOCUMENTS

| | | | |
|---|---|---|---|
| CN | 103819900 | A | 5/2014 |
| CN | 103923464 | A | 7/2014 |
| CN | 103937257 | A | 7/2014 |
| CN | 104004357 | A | 8/2014 |
| CN | 104312528 | A | 1/2015 |
| CN | 104479364 | A | 4/2015 |
| CN | 105018021 | A | 11/2015 |
| CN | 105713552 | A | 6/2016 |
| CN | 105838319 | A | 8/2016 |
| CN | 106221239 | A | 12/2016 |
| CN | 106751908 | A | 5/2017 |
| CN | 106753217 | A | 5/2017 |
| EP | 0234271 | A2 | 9/1987 |
| EP | 1134256 | A1 | 9/2001 |
| EP | 1927636 | A1 | 6/2008 |
| GB | 2284214 | A | 5/1995 |
| JP | H05140456 | | 6/1993 |
| JP | 2001139818 | A | 5/2001 |
| JP | 2001192641 | A | 7/2001 |
| JP | 2004292724 | A | 10/2004 |
| JP | 2005171189 | A | 6/2005 |
| JP | 3831481 | B2 | 10/2006 |
| JP | 2008156578 | A | 7/2008 |
| JP | 2009235265 | A | 10/2009 |
| JP | 2009235279 | A | 10/2009 |
| JP | 2010100665 | A | 5/2010 |
| JP | 2011089079 | A | 5/2011 |
| JP | 2011178821 | A | 9/2011 |
| JP | 2012144704 | A | 8/2012 |
| JP | 2015071662 | A | 4/2015 |
| WO | 2007037552 | A2 | 4/2007 |
| WO | 2007117552 | A1 | 10/2007 |
| WO | 2013058293 | A1 | 4/2013 |
| WO | 2013137423 | A1 | 9/2013 |
| WO | 2015155949 | A1 | 10/2015 |
| WO | 2015155950 | A1 | 10/2015 |
| WO | 2016038836 | A1 | 3/2016 |
| WO | 2018043270 | A1 | 3/2018 |
| WO | 2019054371 | A1 | 3/2019 |
| WO | 2020252772 | A1 | 12/2020 |
| WO | 2020252773 | A1 | 12/2020 |

OTHER PUBLICATIONS

Machine assisted English translation of JP2008156578 obtained from https://patents.google.com/patent on Apr. 1, 2022, 10 pages.
Machine assisted English translation of CN104004357 obtained from https://patents.google.com/patent on Apr. 1, 2022, 10 pages.
Machine assisted English translation of JP2005171189 obtained from https://patents.google.com/patent on Apr. 1, 2022, 6 pages.
Machine assisted English translation of CN103819900 obtained from https://patents.google.com/patent on Apr. 11, 2022, 11 pages.
International Search Report for PCT/CN2019/092285 dated Mar. 24, 2020, 5 pages.
International Search Report for PCT/CN2019/092283 dated Mar. 23, 2020, 5 pages.
Machine assisted English translation of JP2011178821 obtained from https://patents.google.com/patent on Mar. 28, 2022, 11 pages.
Machine assisted English translation of JP2015071662 obtained from https://patents.google.com/patent on Mar. 28, 2022, 11 pages.
Machine assisted English translation of CN102675882 obtained from https://patents.google.com/patent on Mar. 28, 2022, 10 pages.
Machine assisted English translation of CN104312528 obtained from https://patents.google.com/patent on Mar. 28, 2022, 8 pages.
Machine assisted English translation of CN103923464 obtained from https://patents.google.com/patent on Mar. 29, 2022, 9 pages.
Machine assisted English translation of JP2001139818 obtained from https://patents.google.com/patent on Mar. 29, 2022, 7 pages.
Machine assisted English translation of CN106221239 obtained from https://patents.google.com/patent on Mar. 29, 2022, 8 pages.
Machine assisted English translation of JPH05140456 obtained from https://patents.google.com/patent on Mar. 29, 2022, 7 pages.
Machine assisted English translation of JP2010100665 obtained from https://patents.google.com/patent on Mar. 29, 2022, 7 pages.
Machine assisted English translation of JP2011089079 obtained from https://patents.google.com/patent on Mar. 29, 2022, 10 pages.
Machine assisted English translation of CN106753217 obtained from https://patents.google.com/patent on Mar. 29, 2022, 10 pages.
Machine assisted English translation of CN106751908 obtained from https://patents.google.com/patent on Mar. 30, 2022, 10 pages.
Machine assisted English translation of CN103937257 obtained from https://patents.google.com/patent on Mar. 30, 2022, 10 pages.
Machine assisted English translation of CN104479364 obtained from https://patents.google.com/patent on Apr. 15, 2022, 9 pages.
Machine assisted English translation of CN105838319 obtained from https://patents.google.com/patent on Mar. 30, 2022, 9 pages.
Machine assisted English translation of CN105713552 obtained from https://patents.google.com/patent on Mar. 30, 2022, 8 pages.
Machine assisted English translation of CN105018021 obtained from https://patents.google.com/patent on Apr. 1, 2022, 4 pages.
Machine assisted English translation of WO2016038836 obtained from https://patents.google.com/patent on Apr. 1, 2022, 21 pages.
Machine assisted English translation of JP3831481 obtained from https://patents.google.com/patent on Apr. 1, 2022, 10 pages.

* cited by examiner

THERMAL CONDUCTIVE SILICONE COMPOSITION

CROSS-REFERENCE TO RELATED APPLICATIONS

This application is the U.S. National Stage of and claims priority to International Application No. PCT/CN2019/092285 filed on 21 Jun. 2019, the contents of which is incorporated herein by reference.

TECHNICAL FIELD

The present invention relates to a thermal conductive silicone composition, and more specifically, to a thermal conductive silicone composition exhibiting excellent storage stability and handleability despite containing a large quantity of a thermal conductive filler to exhibit high thermal conductivity.

BACKGROUND ART

Thermal conductive silicone compositions, which can cure by a hydrosilylation reaction, form thermal conductive silicone materials having excellent heat resistance, and are therefore used in a variety of applications. For example, as such a thermally conductive silicone composition, Patent Document 1 describes a thermally conductive silicone rubber composition comprising: an organopolysiloxane, an aluminum hydroxide powder having an average particle size of not more than 10 µm, an aluminum oxide powder, platinum or a platinum compound, and a curing agent.

Patent Document 2 describes a thermally conductive silicone grease composition comprising: an aluminum hydroxide powder mixture having an average particle size (post-mixed) of 1 to 15 µm that includes an aluminum hydroxide powder having an average particle size of 0.5 to 5 µm and an aluminum hydroxide powder having an average particle size of 6 to 20 µm, an organopolysiloxane, and an aluminum oxide powder having an average particle size of 0.5 to 100 µm.

Patent Document 3 describes a thermally conductive silicone composition comprising: an organopolysiloxane having at least two alkenyl groups per molecule, an organohydrogenpolysiloxane having at least two silicon atom-bonded hydrogen atoms per molecule, a thermally conductive filler constituted by not less than 70 mass % of an aluminum hydroxide powder, and a platinum-based catalyst.

Patent Document 4 describes a thermally conductive silicone composition comprising: an organopolysiloxane having at least two alkenyl groups per molecule, an organohydrogenpolysiloxane having at least two silicon atom-bonded hydrogen atoms per molecule, a thermally conductive filler constituted by not less than 25 mass % of an alumina and at least 60 mass % of aluminum hydroxide powder, and a platinum-based catalyst.

Such thermally conductive silicone compositions are prepared in two parts, in which an organopolysiloxane having silicon atom-bonded hydrogen atom and a platinum-base catalyst do not exist within one part, and the organopolysiloxane having silicon atom-bonded hydrogen atom exists in a different part from that of the platinum-base catalyst.

To increase the thermal conductivity of such thermally conductive silicone compositions, the content of the aluminium hydroxide in the compositions has to be increased. This, however, brings about problems in terms of the storage stability and handleability of each parts of the silicone compositions, that is, the aluminium hydroxide is precipitated from the silicone compositions and become cakes.

While, Patent Document 5 describes a silicone rubber composition comprising: an organopolysiloxane having at least two silicon atom-boned alkenyl groups per molecule, a SiH-functional diorganopolysiloxane having silicon atom-bonded hydrogen atoms only at both molecular chain terminals, an organopolysiloxane having at least three silicon atom-bonded hydrogen atoms per molecule, a carbasilatran derivative, and a platinum-catalyst.

However, the document above does not specifically recite a thermally conductive silicone composition comprising: an aluminum hydroxide powder having an average particle size of from 5 to 50 µm, and an aluminum hydroxide with an average particle size of at least 0.1 µm and less than 5 µm. Additionally, the document above has no interest in a thermal conductive silicone composition exhibiting excellent storage stability and handleability despite containing a large quantity of a thermal conductive filler to exhibit high thermal conductivity.

PRIOR ART DOCUMENTS

Patent Documents

Patent Document 1: Japanese Patent Application Publication No. H05-140456 A

Patent Document 2: Japanese Patent Application Publication No. 2010-100665 A

Patent Document 3: Japanese Patent Application Publication No. 2011-089079 A

Patent Document 4: Japanese Patent Application Publication No. 2011-178821 A

Patent Document 5: U.S. Patent Application Publication No. 2001/0034403 A1

SUMMARY OF INVENTION

Technical Problem

An object of the present invention is to provide a thermal conductive silicone composition exhibiting excellent storage stability and handleability despite containing a large quantity of a thermal conductive filler to exhibit high thermal conductivity.

Solution to Problem

The thermal conductive silicone composition of the present invention comprises:

(A) 100 parts by mass of a liquid organopolysiloxane with a kinematic viscosity at 25° C. of 10 to 100,000 mm$^2$/s, and having at least two silicon atom-bonded alkenyl groups with 2 to 12 carbon atoms per molecule;

(B) from 100 to 500 parts by mass of a thermal conductive filler with an average particle size of from 5 to 50 µm;

(C) from 10 to 100 parts by mass of a thermal conductive filler with an average particle size of at least 0.1 µm and less than 5 µm; and (D) from 0.1 to 5 parts by mass of a carbasilatrane derivative represented by the following general formula:

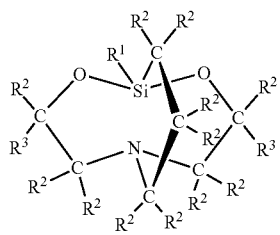

wherein $R^1$ is an alkyl group with 1 to 6 carbon atoms or an alkoxy group with 1 to 3 carbon atoms, $R^2$ are the same or different hydrogen atoms or alkyl groups with 1 to 6 carbon atoms, and $R^3$ are the same or different and are selected from groups represented by the following general formulae:

$$-R^6-SiR^4_a(OR^5)_{(3-a)}$$

$$-R^7-O-R^8$$

wherein $R^4$ is an alkyl group with 1 to 6 carbon atoms, $R^5$ is an alkyl group with 1 to 3 carbon atoms, $R^6$ is an alkylene group with 2 to 6 carbon atoms or an alkylenoxyalkylene group with 4 to 12 carbon atoms, $R^7$ is an alkylene group with 2 to 6 carbon atoms, $R^8$ is an alkyl group with 1 to 6 carbon atoms, an alkenyl group with 2 to 6 carbon atoms or an acyl group with 2 to 6 carbon atoms, and "a" is 0, 1 or 2.

In the composition, component (B) is typically selected from aluminum hydroxide, aluminum oxide or zinc oxide.

In the composition, component (C) is typically selected from aluminum hydroxide, aluminum oxide or zinc oxide.

In the composition, components (B) and (C) are typically surface-treated with a surface treating agent in the presence of component (A), then component (D) is added to a mixture of components (A) to (C).

The surface treating agent is typically selected from hexamethyldisilazane, tetramethyl divinyl disilazane, methyl trimethoxysilane, vinyl trimethoxysilane or dichloro dimethylsilane.

In the composition, component (D) is typically a carbasilatrane derivative represented by the following formula:

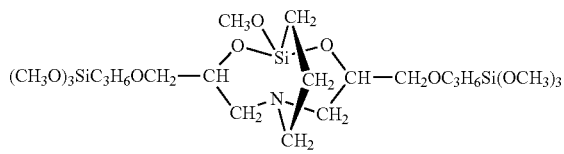

The thermal conductive silicone composition may comprise: (E) an organosiloxane having at least one silicon atom-bonded hydrogen atom per molecule, in an amount of from 1 to 30 parts by mass relative to 100 parts by mass of component (A), to form a part (I), and may further comprise: (G) a liquid organosiloxane with a kinematic viscosity at 25° C. of 1 to 100 mm²/s, and free of alkenyl group and silicon atom-bonded hydrogen atom, in an amount of 1 to 30 parts by mass per 100 parts by mass of component (A).

The thermal conductive silicone composition may comprise: (F) a catalytic amount of a hydrosilylation reaction catalyst, to form a part (II), and may further comprise: (G) a liquid organosiloxane with a kinematic viscosity at 25° C. of 1 to 100 mm²/s, and free of alkenyl group and silicon atom-bonded hydrogen atom, in an amount of 1 to 30 parts by mass per 100 parts by mass of component (A).

The curable thermal conductive silicone composition of the present invention comprises: the part (I) above and the part (II) above, wherein the composition comprises:

(A) 100 parts by mass of a liquid organopolysiloxane with a kinematic viscosity at 25° C. of 10 to 100,000 mm²/s, and having at least two silicon atom-bonded alkenyl groups with 2 to 12 carbon atoms per molecule;

(B) from 100 to 500 parts by mass of a thermal conductive filler with an average particle size of from 5 to 50 μm;

(C) from 10 to 100 parts by mass of a thermal conductive filler with an average particle size of at least 0.1 μm and less than 5 μm;

(D) from 0.1 to 5 parts by mass of a carbasilatrane derivative represented by the following general formula:

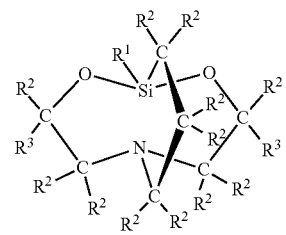

wherein $R^1$ is an alkyl group with 1 to 6 carbon atoms or an alkoxy group with 1 to 3 carbon atoms, $R^2$ are the same or different hydrogen atoms or alkyl groups with 1 to 6 carbon atoms, and $R^3$ are the same or different and are selected from groups represented by the following general formulae:

$$-R^6-SiR^4_a(OR^5)_{(3-a)}$$

$$-R^7-O-R^8$$

wherein $R^4$ is an alkyl group with 1 to 6 carbon atoms, $R^5$ is an alkyl group with 1 to 3 carbon atoms, $R^6$ is an alkylene group with 2 to 6 carbon atoms or an alkylenoxyalkylene group with 4 to 12 carbon atoms, $R^7$ is an alkylene group with 2 to 6 carbon atoms, $R^8$ is an alkyl group with 1 to 6 carbon atoms, an alkenyl group with 2 to 6 carbon atoms or an acyl group with 2 to 6 carbon atoms, and "a" is 0, 1 or 2;

(E) from 1 to 30 parts by mass of an organosiloxane having at least one silicon atom-bonded hydrogen atom per molecule; and (F) a catalytic amount of a hydrosilylation reaction catalyst.

In the composition, component (B) is typically selected from aluminum hydroxide, aluminum oxide or zinc oxide.

In the composition, component (C) is typically selected from aluminum hydroxide, aluminum oxide or zinc oxide.

The curable thermal conductive silicone composition may comprise: (G) a liquid organosiloxane with a kinematic viscosity at 25° C. of 1 to 100 mm²/s, and free of alkenyl group and silicon atom-bonded hydrogen atom, in an amount of 1 to 30 parts by mass per 100 parts by mass of component (A).

Effects of Invention

The thermal conductive silicone composition of the present invention exhibits excellent storage stability and handleability despite containing a large quantity of a thermal conductive filler to exhibit high thermal conductivity.

Definitions

The terms "comprising" or "comprise" are used herein in their broadest sense to mean and encompass the notions of "including," "include," "consist(ing) essentially of," and "consist(ing) of. The use of "for example," "e.g.," "such as," and "including" to list illustrative examples does not limit to only the listed examples. Thus, "for example" or "such as" means "for example, but not limited to" or "such as, but not limited to" and encompasses other similar or equivalent examples. The term "about" as used herein serves to reasonably encompass or describe minor variations in numerical values measured by instrumental analysis or as a result of sample handling. Such minor variations may be in the order of ±0-25, ±0-10, ±0-5, or ±0-2.5, % of the numerical values. Further, the term "about" applies to both numerical values when associated with a range of values. Moreover, the term "about" may apply to numerical values even when not explicitly stated.

It is to be understood that the appended claims are not limited to express and particular compounds, compositions, or methods described in the detailed description, which may vary between particular embodiments which fall within the scope of the appended claims. With respect to any Markush groups relied upon herein for describing particular features or aspects of various embodiments, it is to be appreciated that different, special, and/or unexpected results may be obtained from each member of the respective Markush group independent from all other Markush members. Each member of a Markush group may be relied upon individually and or in combination and provides adequate support for specific embodiments within the scope of the appended claims.

It is also to be understood that any ranges and subranges relied upon in describing various embodiments of the present invention independently and collectively fall within the scope of the appended claims, and are understood to describe and contemplate all ranges including whole and/or fractional values therein, even if such values are not expressly written herein. One of skill in the art readily recognizes that the enumerated ranges and subranges sufficiently describe and enable various embodiments of the present invention, and such ranges and subranges may be further delineated into relevant halves, thirds, quarters, fifths, and so on. As just one example, a range "of from 0.1 to 0.9" may be further delineated into a lower third, i.e., from 0.1 to 0.3, a middle third, i.e., from 0.4 to 0.6, and an upper third, i.e., from 0.7 to 0.9, which individually and collectively are within the scope of the appended claims, and may be relied upon individually and/or collectively and provide adequate support for specific embodiments within the scope of the appended claims. In addition, with respect to the language which defines or modifies a range, such as "at least," "greater than," "less than," "no more than," and the like, it is to be understood that such language includes subranges and/or an upper or lower limit. As another example, a range of "at least 10" inherently includes a subrange of from at least 10 to 35, a subrange of from at least 10 to 25, a subrange of from 25 to 35, and so on, and each subrange may be relied upon individually and/or collectively and provides adequate support for specific embodiments within the scope of the appended claims. Finally, an individual number within a disclosed range may be relied upon and provides adequate support for specific embodiments within the scope of the appended claims. For example, a range "of from 1 to 9" includes various individual integers, such as 3, as well as individual numbers including a decimal point (or fraction), such as 4.1, which may be relied upon and provide adequate support for specific embodiments within the scope of the appended claims.

DETAILED DESCRIPTION OF THE INVENTION

The thermal conductive silicone composition of the present invention will be explained in detail.

Component (A) is a primary component in the present composition and is an organopolysiloxane having at least two silicon atom-bonded alkenyl groups with from 2 to 12 carbon atoms per molecule. Examples of the alkenyl groups include vinyl groups, allyl groups, butenyl groups, pentenyl groups, hexenyl groups, heptenyl groups, octenyl groups, nonenyl groups, decenyl groups, undecenyl groups, and dodecenyl groups, among which vinyl groups are preferable. In addition, examples of groups bonding to silicon atoms other than the alkenyl groups in component (A) include alkyl groups having from 1 to 12 carbon atoms such as methyl groups, ethyl groups, propyl groups, isopropyl groups, butyl groups, isobutyl groups, tert-butyl groups, pentyl groups, neopentyl groups, hexyl groups, cyclohexyl groups, heptyl groups, octyl groups, nonyl groups, decyl groups, undecyl groups, and dodecyl groups; aryl groups having from 6 to 20 carbon atoms such as phenyl groups, tolyl groups, xylyl groups, and naphthyl groups; aralkyl groups having from 7 to 20 carbon atoms such as benzyl groups, phenethyl groups, and phenylpropyl groups; and groups in which some or all of the hydrogen atoms of these groups are substituted with halogen atoms such as fluorine atoms, chlorine atoms, or bromine atoms. Furthermore, the silicon atoms in component (A) may have small amounts of hydroxyl groups or alkoxy groups such as methoxy groups or ethoxy groups within a range that does not impair the object of the present invention.

Examples of the molecular structure of component (A) include a straight-chain structure, a partially branched straight-chain structure, a branched-chain structure, a cyclic structure, and a three-dimensional reticular structure. Component (A) may be one type of organopolysiloxane having these molecular structures or may be a mixture of two or more types of organopolysiloxanes having these molecular structures.

Examples of component (A) include a dimethylpolysiloxane capped at both molecular terminals with trimethylsiloxy groups, a dimethylpolysiloxane capped at both molecular terminals with dimethylvinylsiloxy groups, a dimethylpolysiloxane capped at both molecular terminals with methylphenylvinylsiloxy groups, a copolymer of dimethylsiloxane and methylphenylsiloxane capped at both molecular terminals with trimethylsiloxy groups, a copolymer of dimethylsiloxane and methylphenylsiloxane capped at both molecular terminals with dimethylvinylsiloxy groups, a copolymer of dimethylsiloxane and methylvinylsiloxane capped at both molecular terminals with trimethylsiloxy groups, a copolymer of dimethylsiloxane and methylvinylsiloxane capped at both molecular terminals with dimethylvinylsiloxy groups, a methyl(3,3,3-trifluoropropyl)polysiloxane capped at both molecular terminals with dimethylvinylsiloxy groups, a copolymer of dimethylsiloxane and methylvinylsiloxane capped at both molecular terminals with silanol groups, a dimethylpolysiloxane capped at both molecular terminals with silanol groups, a copolymer of dimethylsiloxane and methylphenylsiloxane capped at both molecular terminals with silanol groups, an organopolysiloxane consisting of a siloxane unit represented by the formula: $CH_3SiO_{3/2}$ and a siloxane unit represented by the formula: $(CH_3)_2SiO_{2/2}$, an organopolysiloxane consisting of a siloxane unit represented by the formula: $C_6H_5SiO_{3/2}$ and a siloxane unit represented by the formula: $(CH_3)_2SiO_{2/2}$, an organopolysiloxane consisting of a siloxane unit represented by the formula: $(CH_3)_3SiO_{1/2}$, a siloxane unit represented by the formula: $CH_3SiO_{3/2}$, and a siloxane unit represented by the formula: $(CH_3)_2SiO_{2/2}$, an organopolysiloxane consisting of a siloxane unit represented by the formula: $(CH_3)_3SiO_{1/2}$, a siloxane unit represented by the formula: $(CH_3)_2(CH_2=CH)SiO_{1/2}$, a siloxane unit represented by the formula $CH_3SiO_{3/2}$, and a siloxane unit represented by the formula: $(CH_3)_2SiO_{2/2}$; and combinations of two or more thereof.

Additionally, a kinematic viscosity at 25° C. of component (A) is in a range of from about 10 to about 100,000 mm²/s, preferably in a range from 10 to 50,000 mm²/s, alternatively in a range from 10 to 10,000 mm²/s, and alternatively in a range from 50 to 10,000 mm²/s. This is because when the kinematic viscosity of component (A) is greater than or equal to the lower limit of the aforementioned range, mechanical properties of a silicone product obtained by curing the silicone composition is improved, and when the kinematic viscosity of component (A) is less than or equal to the upper limit of the aforementioned range, handle-ability of the silicone composition is improved.

Component (B) is a thermal conductive filler with an average particle size of from about 5 to about 50 μm, preferably with an average particle size of from about 5 to about 40 μm, alternatively with an average particle size of from about 5 to about 30 μm, alternatively with an average particle size of from about 10 to about 40 μm, and alternatively with an average particle size of from about 10 to about 20 μm. This is because thermal conductive property of the silicone composition is improved when the average particle size of component (B) is in the range above.

Component (B) is not limited, but is preferably selected from aluminum hydroxide, aluminum oxide or zinc oxide.

The content of component (B) is in a range of from about 100 to about 500 parts by mass, preferably in a range of from about 100 to about 400 parts by mass, alternatively in a range of from about 100 to about 300 parts by mass, alternatively in a range of from about 150 to about 300 parts by mass, and alternatively in a range of from about 150 to about 250 parts by mass, relative to 100 parts by mass of component (A). This is because when the content of component (B) is greater than or equal to the lower limit of the aforementioned range, thermal conductive property of the silicone composition is improved, and when the content of component (B) is less than or equal to the upper limit of the aforementioned range, handle-ability of the curable silicone composition is improved.

Component (C) is a thermal conductive filler with an average particle size of at least 0.1 μm and less than 5 μm, preferably with an average particle size of from about 0.1 to about 4 μm, alternatively with an average particle size of from about 0.1 to about 3 μm, alternatively with an average particle size of from about 0.5 to about 4 μm, and alternatively with an average particle size of from about 0.5 to about 3 μm. This is because thermal conductive property of the silicone composition is improved when the average particle size of component (C) is in the range above.

Component (C) is not limited, but is preferably selected from aluminum hydroxide, aluminum oxide or zinc oxide.

The content of component (C) is in a range of from about 10 to about 100 parts by mass, preferably in a range of from about 20 to about 100 parts by mass, alternatively in a range of from about 30 to about 100 parts by mass, alternatively in a range of from about 40 to about 100 parts by mass, and alternatively in a range of from about 50 to about 100 parts by mass, relative to 100 parts by mass of component (A). This is because when the content of component (C) is greater than or equal to the lower limit of the aforementioned range, thermal conductive property of the silicone composition is improved, and when the content of component (D) is less than or equal to the upper limit of the aforementioned range, handle-ability of the curable silicone composition is improved.

Components (B) and (C) are typically surface-treated with a surface treating agent in the presence of component (A), preferably under heating at 60 to 250° C. or under heating at 100 to 200° C.

The surface treating agent is not limited, but is exemplified by organodisilazane, alkenyl group-containing alkoxysilane, alkyl group-containing lkoxysilane, alkoxy-functional oligosiloxane, cyclic polyorganosiloxane, hydroxyl-functional oligosiloxane, organochlorosilane, or any combination of at least two thereof. The organodisilazane may be hexamethyldisilzane, 1,3-divinyl-trimethyldisilazane, or a mixture of any two or more thereof. The alkenyl group-containing alkoxysilane may be vinyl trimethoxysilane, methylvinyl dimethoxysilane, allyl trimethoxysilane, allylmethyl dimethoxysiane, or a mixture of any two or more thereof. The alkyl group-containing alkoxysilane may be methyl trimethoxysilane, hexyl trimethoxysilane, octyl triethoxysilane, decyl trimethoxysilane, dodecyl trimethoxysilane, tetradecyl trimethoxysilane, octadecyl trimethoxysilane, octadecyl triethoxysilane, or any combination of at least two thereof. The alkoxy-functional oligosiloxane may be $(CH_3O)_3Si[(OSi(CH_3)_2]_C_8H_{17}$, $(CH_3O)_3Si[(OSi(CH_3)_2]_{10}C_8H_{17}$, $(CH_3O)_3Si[OSi(CH_3)_2]_C_{12}H_{25}$, $(CH_3O)_3Si[(OSi(CH_3)_2]_{10}C_{12}H_{25}$, or any combination of ate least two thereof. The hydroxyl-functional oligosiloxane may be dimethyl siloxane or methyl phenyl siloxane. The organochlorosilane may be methyltrichlorosilane, diethyldichlorosilane, or trimethylchlorosilane.

The amount of the surface treating agent is any quantity sufficient for treating component (B) and (C). The particular quantity may vary depending on factors such as the particular treating agent selected and the surface area and amount of untreated thermal conductive filler for component (B) and (C) to be treated. The treating effective amount may range from 0.01 mass % to 20 mass %, alternatively 0.1 mass % to 15 mass %, and alternatively 0.5 mass % to 5 mass %, based on the mass of components (A) to (C).

Component (D) is a carbasilatrane derivative represented by the following general formula:

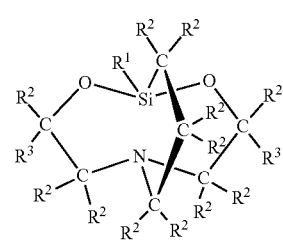

In the formula, $R^1$ is an alkyl group with 1 to 6 carbon atoms or an alkoxy group with 1 to 3 carbon atoms. The alkyl groups are exemplified by methyl groups, ethyl groups and propyl groups, however, methyl groups are preferred from the perspective of economic efficiency and heat resistance. The alkoxy groups are exemplified by methoxy groups, ethoxy groups and propoxy groups.

In the formula, $R^2$ are the same or different hydrogen atoms or alkyl groups with 1 to 6 carbon atoms. The alkyl groups are exemplified by methyl groups, ethyl groups, propyl groups, butyl groups, pentyl group and hexyl groups, however, methyl groups are preferred from the perspective of economic efficiency and heat resistance.

In the formula, $R^3$ are the same or different and are selected from groups represented by the following general formulae:

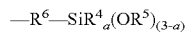

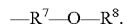

In the formula, $R^4$ is an alkyl group with 1 to 6 carbon atoms. The alkyl groups are exemplified by methyl groups, ethyl groups, propyl groups, butyl groups, pentyl group and hexyl groups, however, methyl groups are preferred.

In the formula, $R^5$ is an alkyl group with 1 to 3 carbon atoms. The alkyl groups are exemplified by methyl groups, ethyl groups and propyl groups.

In the formula, $R^6$ is an alkylene group with 2 to 6 carbon atoms or an alkylenoxyalkylene group with 4 to 12 carbon atoms. The alkylene groups are exemplified by ethylene groups, propylene groups, butylene groups, pentylene group, hexylene groups, heptylene groups and octylene groups, however, ethylene groups and propylene groups are preferred from the perspective of economic efficiency. The alkylenoxyalkylene groups are exemplified by ethylenoxyethylene groups, propylenoxyethylene groups, butylenoxypropylene groups and propylenoxypropylene group, however, ethylenoxypropylene groups and propylenoxypropylene groups are preferred from the perspective of economic efficiency.

In the formula, $R^7$ is an alkylene group with 2 to 6 carbon atoms. The alkylene groups are exemplified by ethylene groups, propylene groups, butylene groups, pentylene group, hexylene groups, heptylene groups and octylene groups, however, ethylene groups and propylene groups are preferred from the perspective of economic efficiency.

In the formula, $R^8$ is an alkyl group with 1 to 6 carbon atoms, an alkenyl group with 2 to 6 carbon atoms, or an acyl group with 2 to 6 carbo atoms. The alkyl groups are exemplified by vinyl groups, allyl groups, butenyl groups, pentenyl group and hexenyl groups, however, ally groups are preferred. The acyl groups are exemplified by acetyl groups, propionyl groups, acryl groups, methacryl groups, butyryl groups, isobutyryl groups, however, acetyl groups are preferred.

In the formula, "a" is 0, 1 or 2, and is preferably 0 or 1.

The carbasilatrane derivatives for component (D) are exemplified by compounds represented by the following formulae:

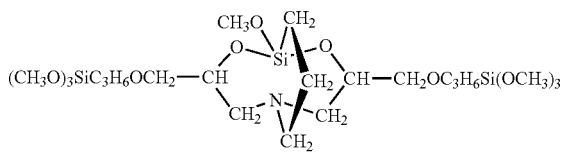

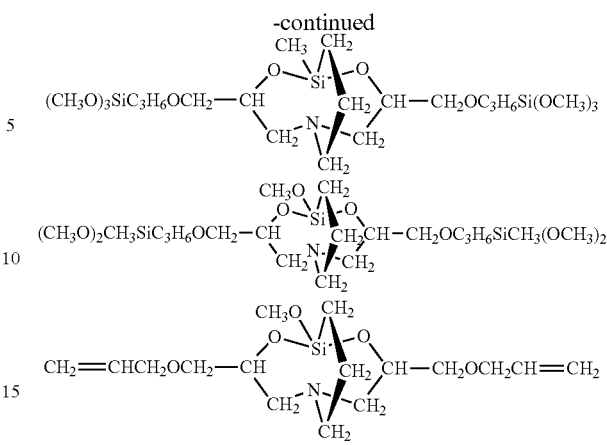

Methods for synthesizing such carbasilatrane derivatives are known. The disclosures of Japanese Patent No. 3831481 B2 and U.S. Pat. No. 8,101,677 B2 are incorporated herein by reference to show the preparation of the carbasilatrane derivatives.

The content of component (D) is in an amount of from about 0.1 to about 5 parts by mass, preferably in an amount of from about 0.1 to about 3 parts by mass, alternatively in an amount of from about 0.1 to about 2 parts by mass, relative to 100 parts by mass of the organopolysiloxane in component (A). This is because when the content of component (D) is greater than or equal to the lower limit of the aforementioned range, the thixotropic property of the silicone composition is improved, and when the content of component (D) is less than or equal to the upper limit of the aforementioned range, thermal conductive property of the silicone material is improved.

The composition may comprise (E) an organosiloxane with at least one silicon atom-bonded hydrogen atom per molecule to form a part (I) in order to improve curability of the composition. Examples of groups bonding to silicon atoms other than hydrogen atoms in component (E) include alkyl groups having from 1 to 12 carbon atoms such as methyl groups, ethyl groups, propyl groups, isopropyl groups, butyl groups, isobutyl groups, tert-butyl groups, pentyl groups, neopentyl groups, hexyl groups, cyclohexyl groups, heptyl groups, octyl groups, nonyl groups, decyl groups, undecyl groups, and dodecyl groups; aryl groups having from 6 to 20 carbon atoms such as phenyl groups, tolyl groups, xylyl groups, and naphthyl groups; aralkyl groups having from 7 to 20 carbon atoms such as benzyl groups, phenethyl groups, and phenylpropyl groups; and groups in which some or all of the hydrogen atoms of these groups are substituted with halogen atoms such as fluorine atoms, chlorine atoms, or bromine atoms. Furthermore, the silicon atoms in component (E) may have small amounts of hydroxyl groups or alkoxy groups such as methoxy groups or ethoxy groups within a range that does not impair the object of the present invention.

Examples of the molecular structure of component (E) include straight-chain, partially branched straight-chain, branched chain, cyclic, and three-dimensional reticular structures, and the molecular structure is preferably a partially branched straight-chain, branched chain, or three-dimensional reticular structure.

Examples of such component (E) include methylhydrogenpolysiloxanes capped at both molecular terminals with trimethylsiloxy groups, dimethylsiloxane-methylhydrogensiloxane copolymers capped at both molecular terminals with trimethylsiloxy groups, dimethylpolysiloxanes capped at both molecular terminals with dimethylhydrogensiloxy groups, dimethylsiloxane-methylhydrogensiloxane copolymers capped at both molecular terminals with dimethylhydrogensiloxy groups, methylhydrogensiloxane-diphenylsiloxane copolymers capped at both molecular terminals with trimethylsiloxy groups, methylhydrogensiloxane-diphenylsiloxane-dimethylsiloxane copolymers capped at both molecular terminals with trimethylsiloxy groups, copolymers consisting of $(CH_3)_2HSiO_{1/2}$ units and $SiO_{4/2}$ units, copolymers consisting of $(CH_3)_2HSiO_{1/2}$ units, $SiO_{4/2}$ units, and $(C_6H_5)SiO_{3/2}$ units, and mixtures of two or more types thereof.

The content of component (E) is in a range of from 1 to 30 parts by mass, preferably in a range of from 1 to 25 parts by mass, alternatively in a range of from 1 to 20 parts by mass, and alternatively in a range of from 5 to 25 parts by mass, relative to 100 parts by mass of component (A). This is because when the content of component (E) is less than or equal to the upper limit of the aforementioned range, mechanical properties of the silicone material are good, whereas when the content of component (E) is greater than or equal to the lower limit of the aforementioned range, curability of the composition is good.

The composition may comprise (F) a hydrosilylation catalyst to form a part (II) in order to accelerate the curing of the present composition. Examples of component (F) include platinum group element catalysts and platinum group element compound catalysts, and specific examples include platinum-based catalysts, rhodium-based catalysts, palladium-based catalysts, and combinations of at least two types thereof. In particular, platinum-based catalysts are preferable in that the curing of the present composition can be dramatically accelerated. Examples of these platinum-based catalysts include finely powdered platinum; platinum black; chloroplatinic acid, alcohol-modified chloroplatinic acid; chloroplatinic acid/diolefin complexes; platinum/olefin complexes; platinum/carbonyl complexes such as platinum bis(acetoacetate), and platinum bis(acetylacetonate); chloroplatinic acid/alkenylsiloxane complexes such as chloroplatinic acid/divinyltetramethyl disiloxane complexes, and chloroplatinic acid/tetravinyl tetramethyl cyclotetrasiloxane complexes; platinum/alkenylsiloxane complexes such as platinum/divinyltetramethyl disiloxane complexes, and platinum/tetravinyl tetramethyl cyclotetrasiloxane complexes; complexes of chloroplatinic acid and acetylene alcohols; and mixtures of two or more types thereof. In particular, platinum-alkenylsiloxane complexes are preferable in that the curing of the present composition can be accelerated.

Examples of the alkenylsiloxane used in the platinum-alkenylsiloxane complex include 1,3-divinyl-1,1,3,3-tetramethyldisiloxane, 1,3,5,7-tetramethyl-1,3,5,7-tetravinylcyclotetrasiloxane, alkenylsiloxane oligomers in which some of methyl groups of these alkenylsiloxanes are substituted with ethyl groups, phenyl groups, or the like, and alkenylsiloxane oligomers in which vinyl groups of these alkenylsiloxanes are substituted with allyl groups, hexenyl groups, or the like. In particular, 1,3-divinyl-1,1,3,3-tetramethyldisiloxane is preferable in that the stability of the platinum-alkenylsiloxane complex that is produced is good.

In order to improve the stability of the platinum-alkenylsiloxane complexes, it is preferable to dissolve these platinum-alkenylsiloxane complexes in an alkenylsiloxane oligomer such as 1,3-divinyl-1,1,3,3-tetramethyldisiloxane, 1,3-diallyl-1,1,3,3-tetramethyldisiloxane, 1,3-divinyl-1,3-dimethyl-1,3-diphenyldisiloxane, 1,3-divinyl-1,1,3,3-tetraphenyldisiloxane, or 1,3,5,7-tetramethyl-1,3,5,7-tetravinyl-cyclotetrasiloxane or an organosiloxane oligomer such as a dimethylsiloxane oligomer, and it is particularly preferable to dissolve the complexes in an alkenylsiloxane oligomer.

The content of component (F) is catalytic amount to to accelerate the curing of the present composition, but it is preferably in an amount of from about 0.01 to about 1,000 ppm of the platinum group metal in this component in terms of mass units with respect to this composition. Specifically, the content is preferably an amount such that the content of platinum group metal in component (F) is in the range of from about 0.01 to about 500 ppm, alternatively in the range of from about 0.1 to about 100 ppm in terms of mass units with respect to the present composition. This is because when the content of component (F) is greater than or equal to the lower limit of the aforementioned range, curability of the composition is good, whereas when the content of component (F) is less than or equal to the upper limit of the aforementioned range, coloration of the cured product is suppressed.

The composition may comprise (G) an organosiloxane free of alkenyl groups and silicon atom-bonded hydrogen atoms in a molecule. Examples of groups bonding to silicon atoms in component (G) include alkyl groups having from 1 to 12 carbon atoms such as methyl groups, ethyl groups, propyl groups, isopropyl groups, butyl groups, isobutyl groups, tert-butyl groups, pentyl groups, neopentyl groups, hexyl groups, cyclohexyl groups, heptyl groups, octyl groups, nonyl groups, decyl groups, undecyl groups, and dodecyl groups; aryl groups having from 6 to 20 carbon atoms such as phenyl groups, tolyl groups, xylyl groups, and naphthyl groups; aralkyl groups having from 7 to 20 carbon atoms such as benzyl groups, phenethyl groups, and phenylpropyl groups; and groups in which some or all of the hydrogen atoms of these groups are substituted with halogen atoms such as fluorine atoms, chlorine atoms, or bromine atoms. Furthermore, the silicon atoms in component (G) may have small amounts of hydroxyl groups or alkoxy groups such as methoxy groups or ethoxy groups within a range that does not impair the object of the present invention.

Examples of the molecular structure of component (G) include straight-chain, partially branched straight-chain, branched chain, cyclic, and three-dimensional reticular structures, and the molecular structure is preferably a partially branched straight-chain, branched chain, or three-dimensional reticular structure.

Examples of such component (G) include dimethylsiloxanes capped at both molecular terminals with trimethylsiloxy groups, dimethylsiloxanes capped at both molecular terminals with dimethylhydoxysiloxy groups, methylphenylsiloxanes capped at both molecular terminals with trimethylsiloxy groups, dimethylsiloxane-methylphenylsiloxane copolymers capped at both molecular terminals with trimethylsiloxy groups, and mixtures of two or more types thereof.

The content of component (G) is not limited, but it is preferably in an amount of about 1 to about 100 parts by mass, alternatively about 5 to about 100 parts by mass, and alternatively about 1 to about 50 parts by mass, relative to 100 parts by mass of component (A). This is because the viscosity of the composition can be reduced if the content of component (G) is not less than the lower limit of the above-mentioned range and mechanical properties of the silicone material is improved if the content of component (H) is not more than the upper limit of the above-mentioned range.

The composition may comprise (H) a hydrosilylation reaction inhibitor in order to prolong the usable time at ambient temperature and to improve storage stability. Examples of component (H) include acetylenic alcohols such as 1-ethynyl-cyclohexan-1-ol, 2-methyl-3-butyn-2-ol, 2-phenyl-3-butyn-2-ol, 2-ethynyl-isopropan-2-ol, 2-ethynyl-butan-2-ol, and 3,5-dimethyl-1-hexyn-3-ol; silylated acetylenic alcohols such as trimethyl (3,5-dimethyl-1-hexyn-3-oxy) silane, dimethyl bis(3-methyl-1-butyn-oxy) silane, methylvinyl bis(3-methyl-1-butyn-3-oxy) silane, and ((1,1-dimethyl-2-propynyl)oxy)trimethylsilane; unsaturated carboxylic esters such as diallyl maleate, dimethyl maleate, diethyl fumarate, diallyl fumarate, and bis(2-methoxy-1-methylethyl) maleate, mono-octylmaleate, mono-isooctylmaleate, mono-allyl maleate, mono-methyl maleate, monoethyl fumarate, mono-allyl fumarate, and 2-methoxy-1-methylethylmaleate; ene-yne compounds such as 2-isobutyl-1-buten-3-yne, 3,5-dimethyl-3-hexen-1-yne, 3-methyl-3-penten-1-yne, 3-methyl-3-hexen-1-yne, 1-ethynyl cyclohexene, 3-ethyl-3-buten-1-yne, and 3-phenyl-3-buten-1-yne; and mixtures of two or more types thereof.

The content of component (H) is in an amount of from about 0.1 to 10,000 ppm in this component in terms of mass units with respect to this composition. Specifically, the content is preferably an amount of from about 1 to about 5,000 ppm, alternatively an amount of from about 10 to about 500 ppm in this component in terms of mass units with respect to the present composition. This is because when the content of component (H) is greater than or equal to the lower limit of the aforementioned range, storage stability of the present composition is good, whereas when the content of component (H) is less than or equal to the upper limit of the aforementioned range, curability of the present composition at low temperatures is good.

The composition may comprise a reinforcing and/or non-reinforcing filler. Examples of the fillers include one or more of finely divided treated or untreated precipitated or fumed silica; precipitated or ground calcium carbonate, zinc carbonate; clays such as finely divided kaolin; quartz powder; zirconium silicate; diatomaceous earth; wollastonite; pyrophylate; and metal oxides such as fumed or precipitated titanium dioxide, cerium oxide, magnesium oxide powder, zinc oxide, and iron oxide. These may also include glass fiber; talc; aluminite; calcium sulphate (anhydrite); gypsum; calcium sulphate; magnesium carbonate; magnesium hydroxide (brucite); graphite; barite, a form of barium sulphate; copper carbonate, e.g., malachite; nickel carbonate, e.g., zarachite; barium carbonate, e.g., witherite; strontium carbonate e.g., strontianite, or a similar inorganic filler.

The content of the reinforcing and/or non-reinforcing filler is not limited, but it is preferably in an amount of about 1 to about 200 parts by mass, alternatively about 5 to about 150 parts by mass, and alternatively about 10 to about 150 parts by mass, relative to 100 parts by mass of component (A). This is because the heat resistance and mechanical properties of the silicone material can be improved if the content of the reinforcing and/or non-reinforcing filler is not less than the lower limit of the above-mentioned range and the viscosity of the composition can be reduced if the content of the reinforcing and/or non-reinforcing filler is not more than the upper limit of the above-mentioned range.

The thermal conductive silicone compositions of this invention can be prepared by combining all of ingredients at ambient temperature. Any of the mixing techniques and devices described in the prior art can be used for this purpose. The particular device used will be determined by the viscosity of the ingredients and the final composition. Cooling of the ingredients during mixing may be desirable to avoid premature curing.

EXAMPLES

The thermal conductive silicone composition of the present invention will be described in detail hereinafter using Practical Examples and Comparative Examples. However, the present invention is not limited by the description of the below listed Practical Examples.

Viscosity

Viscosity was measured using a rotational viscometer such as a Brookfield Synchro-lectric viscometer. Since virtually all materials measured are non-Newtonian in nature, no correlation should be expected between results obtained using different spindles or speeds. The results are generally reported in centipoise. This method is based on ASTM D 1084: HBDV-III, NO. 3 SPINDLE, AT 100 RPM.

Shore A Hardness

A cured silicone material was obtained by heat curing the curable thermal conductive silicone composition for 1 hour at 120° C. in an air circulating oven. The cured silicone materials were stacked to be at least 6 mm in thickness for durometer measurement. The Shore A hardness of the cured silicone material at 25° C. was determined according to test method ASTM D2240-05(2010) (*Standard Test Method for Rubber Property Durometer Hardness*).

Adhesion

The adhesion is determined by measuring the amount of pull required to separate a lap shear laminate. The adhesion of the cured silicone material at 25° C. was determined according to test method ASTM 1002: Add Mix A & B (1:1) and degas by using vacuum. Clean 8 lap shear Al panels (Alclad 2024T3, 1 in.×3 in. (2.5 cm×7.6 cm) and known thickness, Q Panel Company, Cleveland, Ohio). With IPA, place 4 panels on the lower level of the mould, apply mixed sample to each panel, lay a second panel directly on top of each panel to give the specified gap (0.9 mm), then put them into 120 C oven for 1 hour. Take them out and trim any excess material from the edges of the test sample after the sample is cured (Bonding area is 10 mm*25.4 mm), then teste with Instron equipment. The results are reported in pounds per square inch. The amount of adhesive or cohesive failure is estimated.

Settle Check

The settlement check for the presented material is not a standard method. The procedure can be described as below: put 5 kg material in a 5 L pail, leave the container at RT for a period time (1 M/3 M . . . ), then check the material settlement at each planned time. For the settlement check, use a ruler to dip into the material in the container, and stop when the ruler touch a hard material layer, and read the ruler mark (H1) as the soft material height. Second step is to dip the ruler entirely to the pail bottom, to get a whole material layer height (H2). The hard-caking settlement lay can be achieved as H=H2−H1.

The following components were used to prepare the thermal conductive silicone compositions in Practical and Comparative Examples.

Component (a-1): a dimethylpolysiloxane having a viscosity of about 450 mm$^2$/s and endblocked at both molecular chain terminals with dimethylvinylsiloxy groups.

Component (a-2): a dimethylpolysiloxane having a kinematic viscosity of about 70 mm$^2$/s and endblocked at both molecular chain terminals with dimethylvinylsiloxy groups.

Component (b-1): an aluminum hydroxide powder having an average particle diameter of about 15 μm.

Component (c-1): an aluminum hydroxide powder having an average particle diameter of about 1 μm.

Component (d-1): a carbasilatrane derivative represented by the following formula:

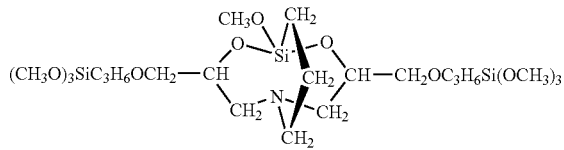

Component (e-1): a dimethylsiloxane-methylhydrogensiloxane co-oligomer having a kinematic viscosity of about 7 mm$^2$/s and endblocked at both molecular chain terminals with trimethylsiloxy groups.

Component (e-2): a dimethylpolysiloxane having a kinematic viscosity of about 65 mm$^2$/s and endblocked at both molecular chain terminals with dimethylhydrogensiloxy groups.

Component (f-1): a platinum complex with 1,3-diethenyl-1,1,3,3-tetramethyldisiloxane in a 1,3-diethenyl-1,1,3,3-tetramethyldisiloxane solution (platinum content=0.1 mass %)

Component (g-1): 1,1,1,3,3,5,5,7,7,7-decamethyltetrasiloxane methyltrimethoxysilane 3-acryloxypropyl trimethoxysilane 1,3,5,7-tetramethyl-1,3,5,7-tetravinyltetracyclosiloxane Practical Example 1

1185 parts by mass of component (a-1), 1610 parts by mass of component (a-2), and 119 parts by mass of methyl trimethoxysilane were combined in a mixer at room temperature. Next, 2489 parts by mass of component (c-1) was combined with the mixture for 10 minutes. Next, total 5808 parts by mass of component (b-1) divided into three times was combined with the mixture for 80 minutes. Next, the mixture was mixed and heated from room temperature to 120° C. in an atmosphere of nitrogen gas, then was mixed at 120° C. for 1 hour under reduced pressure. Next, the mixture was cooled down to 40° C. under reduced pressure. Finally, 742 parts by mass of component (a-2), 23.7 parts by mass of component (d-1), 24.65 parts by mass of component (f-1), and 300 parts by mass of component (g-1) were combined prepared by combining for 20 minutes to produce a thermal conductive silicone composition (1). The characteristics of the thermally conductive silicone composition (1) were determined and the results were listed in Table 1.

Practical Example 2

1950 parts by mass of component (a-1), 464 parts by mass of component (a-2), and 59 parts by mass of methyl trimethoxysilane were combined in a mixer at room temperature. Next, 2497 parts by mass of component (c-1) was combined with the mixture for 10 minutes. Next, total 5827 parts by mass of component (b-1) divided into three times was combined with the mixture for 80 minutes. Next, the mixture was mixed and heated from room temperature to 120° C. in an atmosphere of nitrogen gas, then was mixed at 120° C. for 1 hour under reduced pressure. Next, the mixture was cooled down to 40° C. under reduced pressure. Finally, 24 parts by mass of component (d-1), 308 parts by mass of component (e-1), 768.3 parts by mass of component (e-2), 300 parts by mass of component (g-1), 30 parts by mass of methyl trimethoxysilane, 36 parts by mass of 3-acryloxypropyl trimethoxysilane, and 6.5 parts by mass of 1,3,5,7-tetramethyl-1,3,5,7-tetravinyltetracyclosiloxane were combined prepared by combining for 20 minutes to produce a thermal conductive silicone composition (2). The characteristics of the thermally conductive silicone composition (2) were determined and the results were listed in Table 1.

Curable thermal conductive silicone compositions were prepared by mixing the thermal conductive silicone compositions (1) and (2) before and after aging in a mass ratio of 1:1. The characteristics of silicone materials of the curable thermally conductive silicone compositions were determined and the results were listed in Table 1.

Comparative Example 1

A thermally conductive silicone composition (3) was prepared in the same way as Practical Example 1, except component (d-1) was not added. The characteristics of the thermally conductive silicone composition (3) were determined and the results were listed in Table 1.

Comparative Example 2

A thermally conductive silicone composition (4) was prepared in the same way as Practical Example 2, except component (d-1) was not added. The characteristics of the thermally conductive silicone composition (4) were determined and the results were listed in Table 1.

A curable thermal conductive silicone composition was prepared by mixing the thermal conductive silicone compositions (3) and (4) before and after aging in a mass ratio of 1:1. The characteristics of silicone materials of the curable thermally conductive silicone compositions were determined and the results were listed in Table 1.

TABLE 1

| | | Examples | | | |
|---|---|---|---|---|---|
| | | Practical Examples | | Comparative Examples | |
| Parameters | | 1 | 2 | 1 | 2 |
| Intial | Viscosity (mPa · s) | 3056 | 2368 | 1960 | 1816 |
| | Shore A Hardness | 68 | | 66 | |
| | Adhesion (psi) | 218 | | 279 | |
| After aging 50° C. for 1 week | Viscosity (mPa · s) | 2528 | 2024 | 1768 | 1736 |
| | Shore A Hardness | 69 | | 66 | |
| | Adhesion (psi) | 212 | | 259 | |
| After aging 50° C. for 2 weeks | Viscosity (mPa · s) | 2496 | 2120 | 1800 | 1888 |
| | Shore A Hardness | 67 | | 64 | |
| | Adhesion (psi) | 222 | | 297 | |

TABLE 1-continued

| | | Examples | | | |
|---|---|---|---|---|---|
| | | Practical Examples | | Comparative Examples | |
| Parameters | | 1 | 2 | 1 | 2 |
| After aging 50° C. for 3 weeks | Viscosity (mPa · s) | 2308 | 2104 | 1780 | 1692 |
| | Shore A Hardness | 68 | | 67 | |
| | Adhesion (psi) | 278 | | 257 | |
| Settle check after storage at 25° C. for 1 month | | 0 cm caking (Jell-like) | 0 cm caking (Jell-like) | 1.0 cm caking | 1.0 cm caking |
| Settle check after storage at 25° C. for 3 months | | 0 cm caking (Jell-like) | 0 cm caking (Jell-like) | 3.0 cm caking | 2.0 cm caking |

INDUSTRIAL APPLICABILITY

The thermal conductive silicone composition of the present invention exhibits excellent storage stability and handleability despite containing a large quantity of a thermal conductive filler to exhibit high thermal conductivity. Therefore, the thermal conductive silicone composition is useful, in thermal conductive materials for an electric/electronic apparatus.

The invention claimed is:

1. A thermal conductive silicone composition comprising:
    (A) 100 parts by mass of a liquid organopolysiloxane with a kinematic viscosity at 25° C. of 10 to 100,000 mm²/s, and having at least two silicon atom-bonded alkenyl groups with 2 to 12 carbon atoms per molecule;
    (B) from 100 to 500 parts by mass of a thermal conductive filler, which is aluminum hydroxide with an average particle size of from 5 to 50 μm;
    (C) from 10 to 100 parts by mass of a thermal conductive filler, which is aluminum hydroxide with an average particle size of at least 0.1 μm and less than 5 μm; and
    (D) from 0.1 to 5 parts by mass of a carbasilatrane derivative represented by the following general formula:

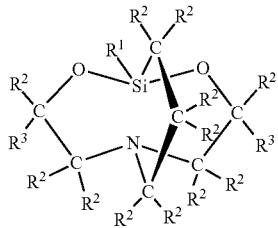

wherein R¹ is an alkyl group with 1 to 6 carbon atoms or an alkoxy group with 1 to 3 carbon atoms, R² are the same or different hydrogen atoms or alkyl groups with 1 to 6 carbon atoms, and R³ are the same or different and are selected from groups represented by the following general formulae:

—R⁶—SiR⁴$_a$(OR⁵)$_{(3-a)}$

—R⁷—O—R⁸ wherein R⁴ is an alkyl group with 1 to 6 carbon atoms, R⁵ is an alkyl group with 1 to 3 carbon atoms, R⁶ is an alkylene group with 2 to 6 carbon atoms or an alkylenoxyalkylene group with 4 to 12 carbon atoms, R⁷ is an alkylene group with 2 to 6 carbon atoms, R⁸ is an alkyl group with 1 to 6 carbon atoms, an alkenyl group with 2 to 6 carbon atoms or an acyl group with 2 to 6 carbon atoms, and "a" is 0, 1 or 2.

2. The thermal conductive silicone composition according to claim 1, wherein component (B) is present in an amount of from about 150 to about 250 parts by mass.

3. The thermal conductive silicone composition according to claim 1, wherein component (C) is present in an amount of from about 50 to about 100 parts by mass.

4. The thermal conductive silicone composition according to claim 1, wherein components (B) and (C) are surface-treated with a surface treating agent in the presence of component (A), then component (D) is added to a mixture of components (A) to (C).

5. The thermal conductive silicone composition according to claim 4, wherein the surface treating agent is selected from the group consisting of hexamethyldisilazane, tetramethyl divinyl disilazane, methyl trimethoxysilane, vinyl trimethoxysilane, and dichloro dimethylsilane.

6. The thermal conductive silicone composition according to claim 1, wherein component (D) is a carbasilatrane derivative represented by the following formula:

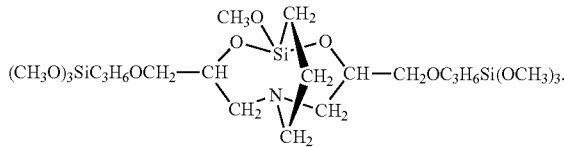

7. The thermal conductive silicone composition according to claim 1, further comprising:
    (E) an organosiloxane having at least one silicon atom-bonded hydrogen atom per molecule, in an amount of from 1 to 30 parts by mass relative to 100 parts by mass of component (A).

8. The thermal conductive silicone composition according to claim 7, further comprising:
    (G) a liquid organosiloxane with a kinematic viscosity at 25° C. of 1 to 100 mm²/s, and free of an alkenyl group and a silicon atom-bonded hydrogen atom, in an amount of from 1 to 30 parts by mass per 100 parts by mass of component (A).

9. The thermal conductive silicone composition according to claim 1, further comprising:
    (F) a catalytic amount of a hydrosilylation reaction catalyst.

10. The thermal conductive silicone composition according to claim 9, further comprising:
    (G) a liquid organosiloxane with a kinematic viscosity at 25° C. of 1 to 100 mm²/s, and free of an alkenyl group and a silicon atom-bonded hydrogen atom, in an amount of from 1 to 30 parts by mass per 100 parts by mass of component (A).

11. The thermal conductive silicone composition according to claim 1, further defined as a curable thermal conductive silicone composition comprising a part (I) and a part (II), wherein the curable thermal conductive silicone composition further comprises:
    (E) from 1 to 30 parts by mass of an organosiloxane having at least one silicon atom-bonded hydrogen atom per molecule, to form part (I); and (F) a catalytic amount of a hydrosilylation reaction catalyst, to form part (II); and wherein each of components (A), (B), (C), and (D) is in part (I) and/or in part (II).

12. The curable thermal conductive silicone composition according to claim 11, further comprising:

(G) a liquid organosiloxane with a kinematic viscosity at 25° C. of 1 to 100 mm$^2$/s, and free of an alkenyl group and a silicon atom-bonded hydrogen atom, in an amount of from 1 to 30 parts by mass per 100 parts by mass of component (A);

wherein component (G) is in part (I) and/or in part (II).

* * * * *